UNITED STATES PATENT OFFICE.

JAMES L. ROWLAND, OF MILWAUKEE, WISCONSIN.

IMPROVEMENT IN THE MANUFACTURE OF ARTIFICIAL STONE.

Specification forming part of Letters Patent No. 78,327, dated May 26, 1868.

*To all whom it may concern:*

Be it known that I, JAMES L. ROWLAND, of Milwaukee, in the county of Milwaukee and State of Wisconsin, have invented a new and useful Mode for the Production of Manufactured Stone; and I do hereby declare that the following is a full, clear, and exact description of the several ingredients, and the process of treating and compounding the same.

First, I procure some of one or more of the various kinds of sands, rocks, scoriæ, and other hard materials, and crush the same to a degree of fineness depending somewhat on particular qualities or properties desired in the manufactured article. For instance, a stone that is to receive fine and delicate impressions, and to present a sharp outline and a very smooth polished surface, requires that these materials should be very finely pulverized. The breaking down, crushing, and pulverizing of the materials above described result in particles of a variety of sharp angular forms, with rough fragmentary and clean surfaces, which particles can be most fitly and compactly compressed into a mechanical arrangement of the greatest strength and permanency. By thus reducing the materials they will have a more extended contact, and afford more connecting-surfaces, than material which is formed in a natural fine state with the atoms dulled and rounded by attrition.

I also procure the best hydraulic cement, see that it is free from moisture, then improve it by taking out, with sieves, or by bolting-cloth, all the lumpy, injurious, and inefficient portions, and by next pulverizing it with rollers or other suitable machinery to the greatest practicable degree of fineness, after which it is passed through bolting-cloth of exceedingly fine texture, so as to exclude all that is not in a perfectly-powdered condition. By this treatment of the cement I obtain a combining medium wrought to such a condition that it may be gelatinized or dissolved by certain alkaline solutions, hereinafter mentioned, into a thin cement or paste of the highest attainable efficiency.

I also employ some of one or more of the native earths and oxides of metals, in a finely-pulverized state, according to the color desired in the manufactured article. I then thoroughly and intimately mix all of these prepared materials by means of sieves or otherwise.

The material obtained from the rocks, sands, scoriæ, and other hard substances may be mixed with the improved cement in different ratios, from one to one to ten to one, inclusive, in bulk. Two to one, two to five, or two to seven is a suitable ratio for many kinds of manufactured stone. The ratio in bulk of the native earths and oxides to the cement varies according to the degree of color and shade required.

To this mixture I add water by sprinkling it through sieves or other suitably perforated vessel, or, what is preferable and greatly more efficient, a solution of two or more of the following salts: Soda, potash, baryta, or their carbonates, sulphate of alumina or alum, in quantities and combinations the best adapted to effect certain chemical changes that aid in the union and consolidation of the material, which experiment has indicated to be strong solutions used in quantities that will just moisten the entire mass.

In this process of moistening, intermix rapidly and thoroughly till the whole is brought to the fittest condition and consistency to be wrought into molds, receive and retain impressions, or otherwise manage, and when two or more salts are used, equal parts are recommended; but the weaker solutions and other proportions will produce good results.

I then proceed to mold or work the mass into the desired forms or shapes, letter, and put on other impressions, if desired, and apply external pressure, as speedier and the most satisfactory results are obtained with the greatest practicable pressure.

To obtain the speediest results and greatest hardness, I place the material, after it has been properly molded and stripped of its molds, into tanks, conveniently arranged and of suitable construction, and force into such tanks carbonic acid or water charged with this gas. In this condition the material is exposed from one to three, five or eight days, or longer, either under pressure or not. Then draw off the gas or charged solution into adjoining tanks, thereby preserving the same for future use. When the material has been exposed to the air for a short time, if it is not sufficiently indurated and matured, it may be again exposed to the action of the gas, and this process may be repeated as often as may be found necessary, or until the required degree of hardness and solidity is attained; or when the material has been placed in tanks, an apartment, or structure of suitable construction for the operation, I submit it to the action of carbonic acid and heat produced by burning charcoal, and also to the vapor and steam created at the same time, by placing a vessel of water over this burning charcoal, or steam injected into the tanks, apartment, or structure, from time to time, in such quantities as to moisten the material sufficiently to best insure the most efficient action of this gas in hardening and maturing it. I find that this gas works the most efficiently when the material is furnished with a certain amount of moisture.

By the use of carbonic acid in the manner described, or in any other suitable manner, I secure a speedy and effectual means for maturing and hardening the manufactured stone, and also for hardening mixtures, or combinations of other materials, the bases of which are lime and the hydraulic cements, and where there may be an affinity and need or efficiency in this gas to effect the union and consolidation, the object and advantage of this being that the stone or other material, instead of being limited, as in other cases, to the absorption of the small quantities of this gas contained in the surrounding atmosphere, is furnished by this process, at once, with an abundant and full supply, and in such manner that it may take to itself any proportion and quantity of this element equal to its affinity and need.

A cheap and durable stone may be produced by the use of the natural sands, by combining them, or not, with the prepared material, the same being intermixed with the aforedescribed improved cement and the salts in solution, or water alone, in the ratio as, and treated in the manner, described for the prepared material.

If color is desired, the native earths, or metallic oxides, may be used in suitable proportions, as described. I prefer, however, to purify and to crush and reduce the sands or other mineral substance used, for the purpose of obtaining coherent angular and freshly-broken surfaces; but, if desirable, the sands may be used with good results by simply drying and sifting out the coarser grains.

I do not intend to confine myself to the precise proportions of the several substances or elements herein described as entering into the composition of the improved stone, as these proportions may be varied without affecting the general result.

Having described my invention, what I claim as new, and desire to secure by Letters Patent, is—

1. The use of the various kinds of sands, rocks, scoriæ, and other hard mineral substances, crushed and otherwise treated as described, and combined with a cement or a cement and a salt, prepared substantially as set forth.

2. The use of sand in its natural state, or when it is deprived of its coarser grains, in combination with the improved cement, and with water alone, or with a solution of one or more of the salts herein specified.

3. The use of native earths, metallic oxides, or other like substances, prepared and combined substantially as described, for the purpose of coloring the stone.

4. The methods of treating and preparing hydraulic cement for the manufacture of stone, substantially as described.

5. The use of carbonic acid in the process of hardening manufactured stone, or other article having lime for its base, substantially as described.

6. The use of steam in combination with carbonic-acid gas, substantially as described.

JAS. L. ROWLAND.

Witnesses:
E. FIELD,
WILLIAM SCHOOF.